Patented May 30, 1939

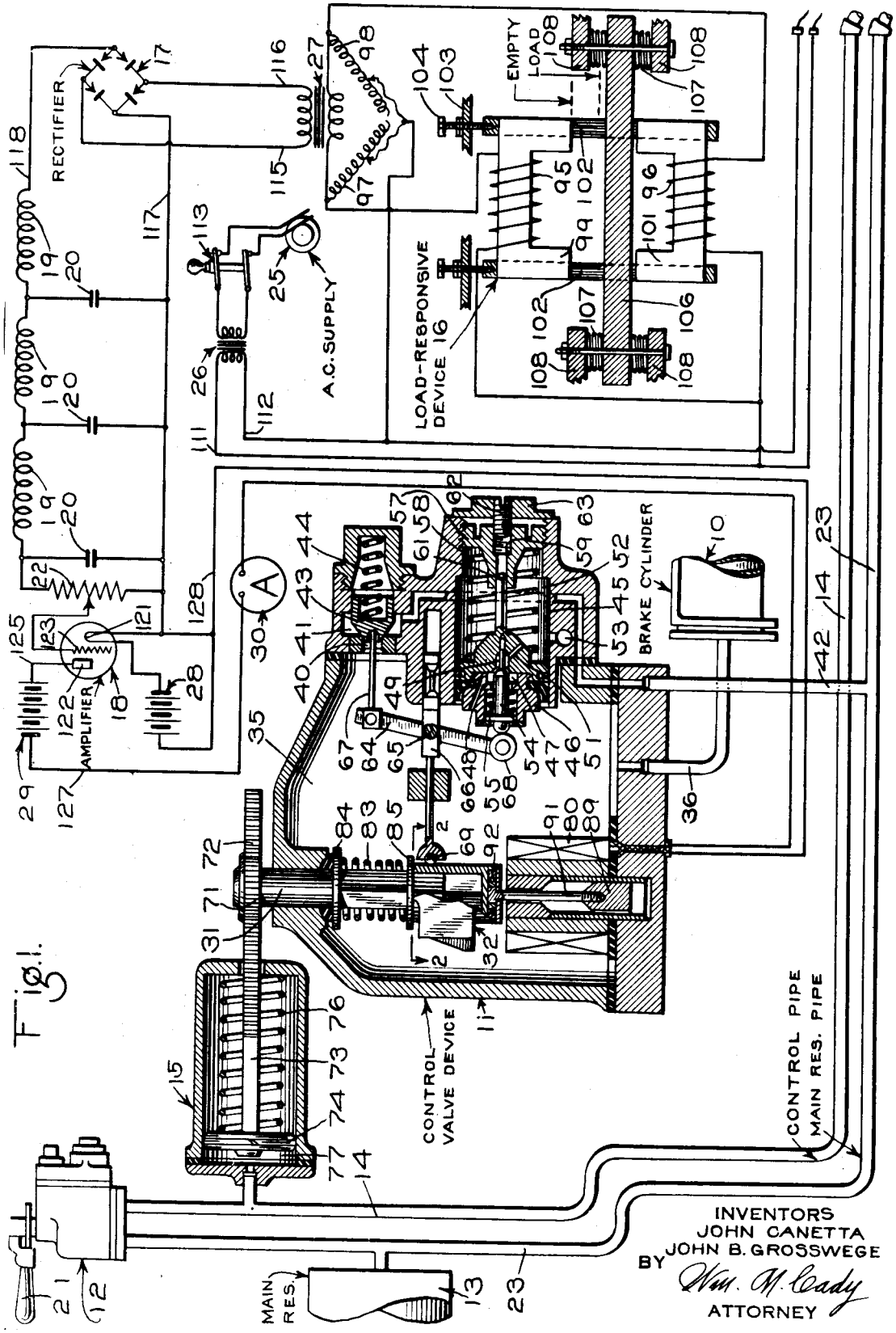

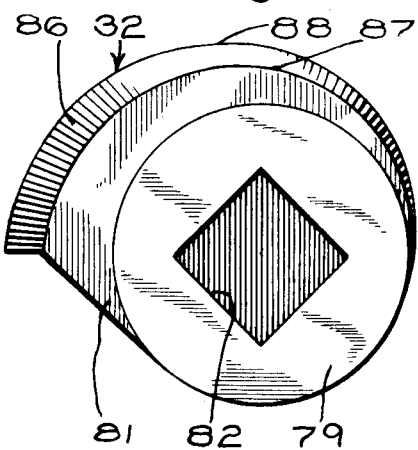
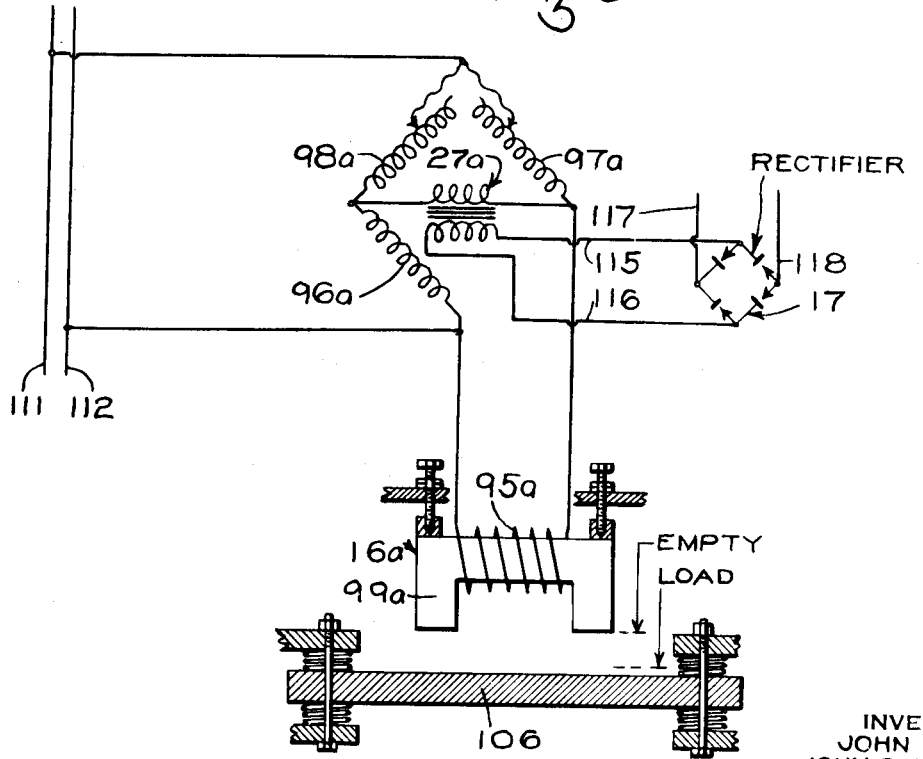

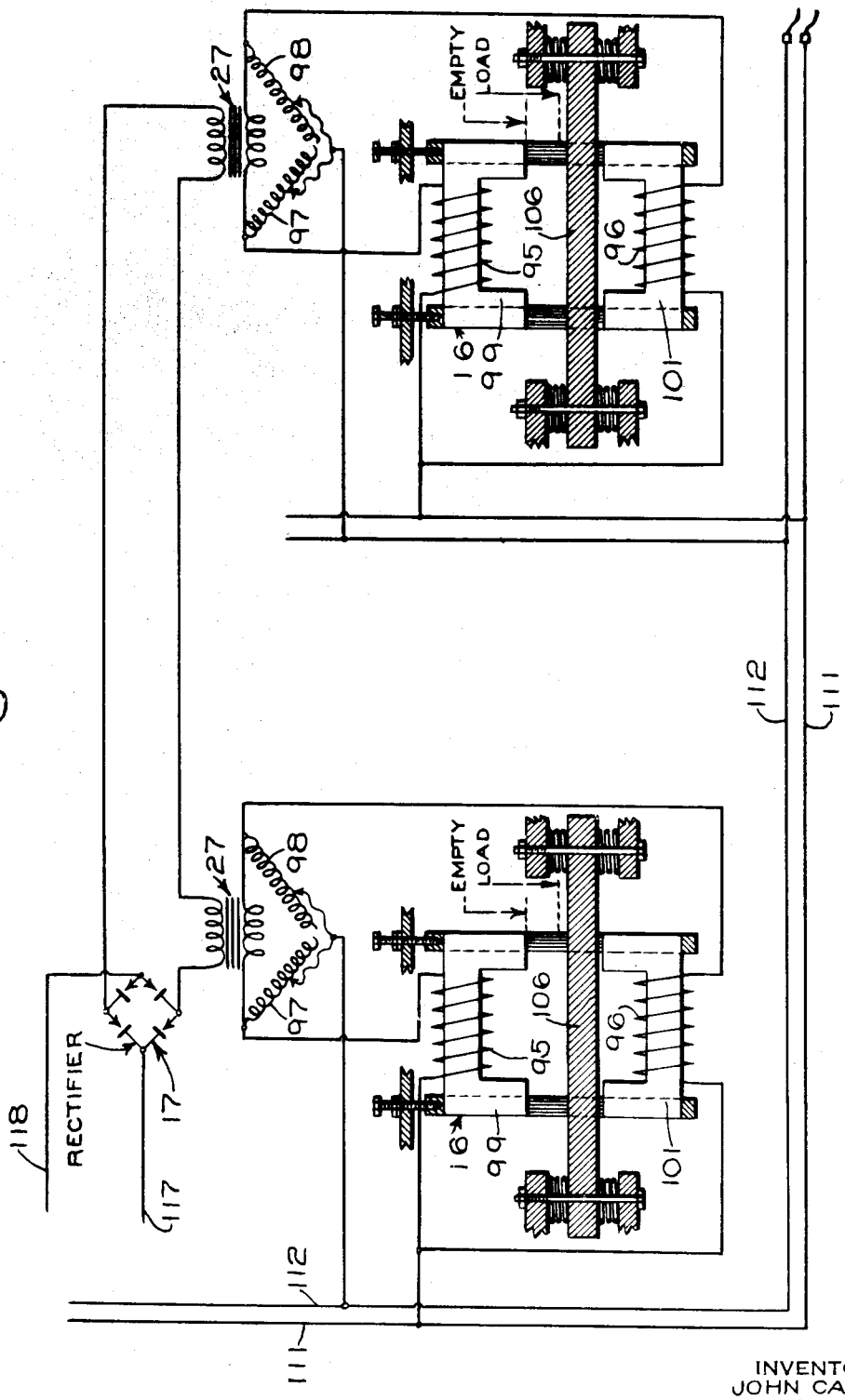

2,160,210

UNITED STATES PATENT OFFICE 2,160,210

VARIABLE LOAD BRAKE

John Canetta, Wilkinsburg, and John B. Grosswege, Edgewood, Pa., assignors to The Westinghouse Air Brake Company, Wilmerding, Pa., a corporation of Pennsylvania Application August 24, 1937, Serial No. 160,592

23 Claims. (Cl. 303—22)

This invention relates to variable load brakes and particularly to variable load brake equipments including mechanism automatically conditioned according to the load on a car or car truck while the car is in motion, for correspondingly controlling the degree of braking force with which an application of the brakes is effected.

In our copending application Serial No. 139,128, filed April 27, 1937, and assigned to the same assignee as the present application, we have disclosed and claimed a variable load brake equipment including a control valve device which is variably conditionable according to the load on a car or car truck while the car is in motion to automatically and correspondingly control the degree of application of the brakes. The means provided for variably conditioning the control valve device according to the load on the car or car truck is in the form of a voltage translating or transformer device adapted to have the output voltage thereof varied according to variations in the load on the car or car truck.

It is an object of our present invention to provide a variable load brake equipment of the character disclosed in our above mentioned copending application but including a different type of device responsive to the load on the car or car truck.

More specifically, it is an object of our invention to provide a variable load brake equipment including a device which is responsive to the load on a car or car truck and which may be applied to a car structure in a relatively simple manner without requiring mechanically cooperative contacting parts, thereby avoiding wear of parts and the problems incidental to the usual swiveling of a car truck relative to the car body as the car rounds a curve.

Another object of our invention is to provide a variable load brake equipment which is adapted to control the degree of braking force with which an application of the brakes is effected according to the average load on a plurality of car trucks.

The above objects and other objects of our invention which will be made apparent hereinafter, are obtained by several illustrative embodiments of our invention which will be described subsequently and which are shown in the accompanying drawings, wherein Fig. 1 is a simplified diagrammatic view of a variable load brake equipment illustrating one embodiment of our invention, Fig. 2 is a view, taken on the line 2—2 of Fig. 1, showing in further detail the construction of the conoidal cam employed in the control valve device of Fig. 1, Fig. 3 is a fragmentary view showing an embodiment of our invention including a modification of the load-responsive device of Fig. 1, and Fig. 4 is a fragmentary view, showing another embodiment of our invention wherein two load-responsive devices are arranged to register the average load on a plurality of car trucks.

*Brief description of the equipment shown in Fig. 1*

The equipment shown in Fig. 1 comprises, briefly, at least one brake cylinder 10, a control valve device 11 for controlling the supply of fluid under pressure to and the release of fluid under pressure from the brake cylinder 10, a brake valve device 12 for controlling the operation of the control valve device 11 through the medium of a control pipe 14, which is supplied with fluid under pressure from a main reservoir 13 under the control of the brake valve device, and a pressure-operated device 15 which is controlled according to the pressure in the control pipe 14.

According to our present invention the equipment further includes a load-responsive device 16 adapted to control the conditioning of the control valve device 11 according to the load on a car or car truck. A rectifier 17, preferably of the dry-disc or copper oxide type, is provided for rectifying the alternating current output from the load-responsive device 16 and, if desired, an amplifier or relay device such as a three electrode vacuum tube 18 may be provided for producing a greater sensitivity to variations in load and also for providing the required amount of power for effecting variations in the condition of the control valve device 11. A filter circuit including a plurality of inductance coils 19 and a plurality of condensers 20, arranged as shown in the drawings, may be provided for smoothing out the pulsating direct current output from the rectifier 17. A potentiometer 22 is provided for varying the degree of potential bias on the grid of the vacuum tube amplifier 18 according to the voltage output from the rectifier 17.

Other parts of the equipment may include a pipe connected to the main reservoir 13 and hereinafter referred to as the main reservoir pipe 23, a source of alternating current such as the generator 25 carried on the car, suitably designed transformers 26 and 27 the purpose of which will be made clear hereinafter, a source of electric current such as a battery 28 for heating the filament of the vacuum tube amplifier 18, a source of electric current such as a battery 29 included in the plate circuit of the vacuum tube amplifier 18, and an ammeter 30 for indicating the current in the plate circuit of the amplifier 18.

*Detailed description of the equipment shown in Fig. 1*

The brake valve device 12 is of a self-lapping type, such as described and claimed in Patent No. 2,042,112 of Ewing K. Lynn and Rankin J. Bush, effective upon the operation of the operating handle 32 thereof from a normal brake release position to cause fluid under pressure to be supplied from the main reservoir 13 through the main reservoir pipe 23 to the control pipe 14 and establish a pressure in the control pipe 14 according to the degree or extent to which the operating handle is moved out of its normal position into an application zone. The brake valve device 12 is located on a control car of a train and functions to control the operation of one or more control valve devices 11 associated with different brake cylinders along the length of the train, only one control valve device 11 being shown for simplicity.

The control valve device 11 is of the type described and claimed in the copending application Serial No. 138,740 of John Canetta, one of the present joint applicants, which application was filed April 24, 1937. The control valve device 11 comprises a sectionalized casing having therein a chamber 35, hereinafter referred to as the pressure chamber, which may be connected to the brake cylinder 10 as through a pipe 36.

Also formed in the casing is a chamber 41 constantly charged with fluid under pressure as from the main reservoir 13 through the main reservoir pipe 23 and a branch pipe and passage 42. A supply valve 43 is contained in the chamber 41 and is normally yieldingly urged into seated relation on an associated valve seat by a spring 44 to cut off communication between the chamber 41 and the pressure chamber 35 through a port 40.

Also formed in the casing of the control valve device 11 is a bore 45 in which a piston 46 operates, the piston being subject on one side to the pressure in the chamber 35 and having at the opposite side a chamber 52 which is constantly open to atmosphere through an exhaust port and passage 53. Formed in the piston 46 is a chamber 47 which is constantly connected to the pressure chamber 35 through a port or passage 48 in the piston.

A pin type valve 54, hereinafter called the release valve, is contained in the chamber 47 and is normally yieldingly biased to an unseated position by a spring 55 to open communication from chamber 47 and the connected pressure chamber 35 to the atmospheric chamber 52 through an axial bore 49 and a port or passage 51.

Interposed in the chamber 52 between the piston 46 and a threaded plug 57 screwed into the outer end of the bore 45 is a coil spring 58 which urges the piston 46 inwardly of the bore 45 and yieldingly opposes movement of the piston outwardly of the bore. In the plug 57 is an axial bore 59 having a smooth inner portion and threaded outer portion. The smooth inner portion of the bore 59 receives the end of a stem 61 of the piston 46 and the outer threaded portion of the bore 59 receives a set screw 62 which is adapted to be engaged by the outer end of the stem 61 of the piston 46 and serves as a stop to limit the movement of the piston 46 outwardly of the bore 45. A lock nut 63 may be provided on the set screw 62 to prevent undesired loosening thereof.

Operation of the supply valve 41 and the release valve 54 is effected by means of a so-called "floating" lever 64 which is pivotally mounted intermediate its ends, as by a pin 65, on an actuating rod or stem 66 which is slidably mounted in the casing. One end of the lever 64 has pivotally attached thereto a rod or stem 67 which extends through port 40 and engages in a recess in the face of the supply valve 41 at the inner seated area thereof. A roller 68 is mounted at the opposite end of the lever 64 and is adapted to engage the inner end of the release valve 54 which projects into the pressure chamber 35.

The actuating rod 66 is shifted axially to different positions by rotation of a rotary operating shaft 31 suitably journaled in the casing and having thereon a conoidal cam element 32.

As will be seen in Figs. 1 and 2, the conoidal cam element 32 comprises a cylindrical body portion 79 and a cam portion 81 preferably integral with the body portion 79. At the upper end of the body portion 79 is a polygonal recess 82, shown as a square recess, for slidably receiving the inner end of the rotary shaft 31 of corresponding cross-section. A coil spring 83 concentrically surrounding the rotary shaft 31 and interposed between a flange or collar 84, fixed to the shaft, and the upper face of the cam element 32 yieldingly opposes upward movement of the cam element relative to the rotary shaft 31. If desired, a collar or washer 85 may be interposed between the spring 83 and the upper end of the cam element 32.

The cam portion 81 of the cam element 32 has formed thereon a sloping cam surface 86 which connects an upper inner spiral line 87 and a lower outer spiral line 88. The sloping cam surface 86 is in reality a succession of an infinite number of spiral line surfaces increasing progressively in eccentricity on a radial line from the inner spiral line 87 to the outer spiral line 88, all of the spiral lines merging into a common vertical plane or line at the originating end of the spirals.

The arrangement of the conoidal cam element 32 and the actuating rod 66 is such that the inner end of the actuating rod 66 is adapted to contact the cam surface 86, a small ball-bearing 69 being provided at the inner end of the actuating rod for minimizing the friction at the point of contact with the cam surface and also for rendering the actuating rod more sensitive to movement of the conoidal cam element.

With the rotary shaft 31 in its normal release position, the bearing 69 at the inner end of the actuating rod 66 engages the cam surface 86 of the cam element 32 at the originating end thereof so that regardless of the position of the cam element vertically with respect to the rotary shaft 31, the actuating rod 66 is always returned to the same normal position upon return of the shaft 31 to its normal position after being displaced therefrom.

It will be apparent that the degree or extent to which the actuating rod 66 is shifted in the right-hand direction, from its normal position shown, for a given degree of rotary movement of the operating shaft 31 out of its release position in a clockwise direction as viewed from above the control valve device 11 in Fig. 1, will depend upon the position of the cam element 32 axially with respect to the shaft 31. When the cam element 32 is in its lowermost position as shown in Fig. 1 and the bearing 69 on the actuating rod 66 engages the cam surface 86 adjacent the inner spiral line 87, the actuating rod 66 is shifted in the right-hand direction a minimum amount for a given degree of rotary movement of the operating shaft 31, the extent of the displacement of the actuating rod 66 increasing as the cam element 32 is raised or shifted axially upward. The maximum degree of displacement of the actuating rod 66 in the right-hand direction, from the normal position shown, for a given degree of rotary movement of the shaft 31 from its normal position will occur when the cam element 32 is raised sufficiently for the bearing 69 to contact the cam surface 86 substantially on the lower outer spiral line 88.

The position of the cam element 32 axially with respect to the shaft 31 is determined according to the degree of energization of a solenoid coil 80 through the medium of a plunger 89 of magnetic material having a stem 91 which is rotatably secured to the lower end of the cam element 32 as by a suitable ball bearing race 92. The plunger 89 operates in a suitable bushing and may be keyed within the bushing in such manner as to prevent rotation of the plunger. The rotatable connection of stem 91 to the cam element 32, however, permits free rotation of the cam element 32, even though the plunger is non-rotatable.

Rotation of the operating shaft 31 of control valve device 11 is effected by the pressure-operated device 15 under the control of the brake valve device 12. As will be readily apparent in Fig. 1, pressure device 15 comprises a cylinder containing a piston 74 having a stem 73 which is provided at the extremity thereof with a gear rack portion 72 arranged to mesh with a suitable pinion gear 71 fixed to the outer end of the rotary shaft 31 of the control valve device 11. Interposed between the piston 74 and the end wall of the cylinder of the device 15 is a coil spring 76 which urges the piston 74 in the left-hand direction to a certain uniform position which determines the normal brake release position of the rotary operating shaft 31 of the control valve device 11.

At the opposite side of the piston 74 is a chamber 77 which is constantly connected to the control pipe 14 and, when fluid under pressure is supplied to the chamber 77, the piston 74 is shifted in the right-hand direction to a degree corresponding to the pressure established in the chamber 77 to correspondingly rotarily shift the operating shaft 31.

Assuming that the rotary shaft 31 is rotated through a given angle from its normal position and that the actuating rod 66 is correspondingly shifted in the right-hand direction, operation of the supply valve 41 and the release valve 54 of the control valve device 11 is effected in the following manner. The spring 55 biasing the release valve 54 to unseated position is weaker than the spring 44 urging the supply valve 41 to seated position, and consequently the shifting of the rod 66 in the right-hand direction causes the floating lever 64 to pivot about its upper end in such manner that the lower end thereof shifts in the right-hand direction to seat the release valve 54 and thus cut off the exhaust communication from the pressure chamber 35 to atmosphere through port 53.

The spring 58 urging the piston 46 inwardly of the bore 45 is stronger than the spring 44 and thus, after the release valve 54 is seated, further movement of the actuating rod 66 in the right-hand direction causes the floating lever 64 to pivot about its lower end in such manner that the upper end thereof shifts in the right-hand direction and, through the stem 67, effects unseating of the supply valve 41 against the force of the spring 44. Fluid under pressure is accordingly supplied from the main reservoir 13 to the brake cylinder 10 by way of the main reservoir pipe 23, branch pipe and passage 42, chamber 41, past the unseated supply valve 43, port 40, pressure chamber 35 and pipe 36.

When the pressure of the fluid in the pressure chamber 35 and brake cylinder 10 increases sufficiently that the force which it exerts on the inner face of the piston 46 is sufficient to overcome the spring 58, the piston 46 moves outwardly of the bore 45. Thereupon, the spring 44 becomes effective to shift the supply valve 43 to seated position to cut off the further supply of fluid under pressure to the chamber 35, the release valve 54 being held seated to prevent the release of fluid under pressure from the chamber 35 due to the force exerted by the spring 44 which causes the floating lever 64 to pivot on the pin 65 intermediate the ends thereof.

If the rotary shaft 31 is rotated to a further extent out of its release position, the supply valve 43 is again unseated to cause fluid under pressure to be again supplied to the pressure chamber 35 and the brake cylinder 10, the supply of fluid under pressure to the chamber 35 being cut off when the fluid pressure in the chamber 35 increases sufficiently to again move the piston 46 outwardly of the bore 45 to permit reseating of the supply valve 43. It will thus be apparent that by suitably designing the eccentricity of the cam surface 86 on the cam element 32, the pressure established in the pressure chamber 35 and brake cylinder 10 may correspond to the degree of rotative displacement of the rotary shaft 31 from its normal position.

The maximum degree of pressure, corresponding to the maximum pressure obtainable from the main reservoir 13, is established in the pressure chamber 35 and brake cylinder 10 when the rotary shaft 31 is rotatively shifted out of its release position to a maximum degree. In such case, the end of the stem 61 of the piston 46 engages the inner end of the stop screw 62, as the piston 46 is moved outwardly of the bore 45 by the fluid pressure in the chamber 35, before the supply valve 43 can be returned to seated position. Thus, the supply valve 43 is maintained unseated and consequently the pressure from the main reservoir equalizes into the pressure chamber 35 and brake cylinder 10.

When the rotary shaft 31 is rotated back toward its normal position from an application position, the force holding the release valve 54 seated is relieved and, consequently, the spring 55 becomes effective to unseat the release valve 54 and cause it to establish communication through which fluid under pressure is released from the pressure chamber 35 and brake cylinder 10 to atmosphere through the exhaust port 53. As the pressure in the chamber 35 reduces, the spring 58 becomes effective to return the piston 46 inwardly of the bore 45 and thus to effect reseating of the release valve 54.

If the rotary shaft 31 is again shifted a certain amount back toward its normal release position, the release valve is again unseated to cause further reduction in the pressure in the chamber 35 and brake cylinder 10 until the pressure in the chamber 35 is reduced sufficiently to permit movement of the piston 46 inwardly of the bore 45 by the spring 58 to effect reseating of the release valve 54.

When the rotary shaft 31 is returned to its normal position the spring 58 is ineffective to shift the piston 46 sufficiently inwardly of the bore 45 to reseat the release valve 54 and, thus, the pressure chamber 35 and the brake cylinder 10 remain connected to atmosphere through the exhaust port 53 so that the complete release of fluid under pressure from the brake cylinder and corresponding release of the brakes is effected.

Since the degree to which the actuating rod 66 is shifted in the right-hand direction from its normal position, for rotation of the rotary shaft 31 through a given angle from its normal position increases as the cam element 32 is shifted upwardly relative to the rotary shaft 31, it will be seen that the pressure attained in the pressure chamber 35 and brake cylinder 10 will be correspondingly greater.

The load-responsive device 16 comprising our invention is in the form of a Wheatstone bridge circuit including four impedance coils 95, 96, 97 and 98, in the four different legs of the bridge circuit respectively. The coils 95 and 96 have associated respectively therewith U-shaped core members 99 and 101 of suitable magnetic material, which are connected together by a plurality of struts 102 of suitable non-magnetic material and secured to a so-called "sprung" portion of the vehicle, such as the vehicle frame or car body 103, as by screws 104 whereby the core members 99 and 101 may be adjusted relative to the car body. The load-responsive device 16 further comprises a sheet or plate 106, of magnetic material, which may be laminated if desired, the plate being resiliently supported as by a plurality of springs 107 interposed between opposite faces of the plate and a plurality of pairs of spaced tongues or brackets 108 which are attached to an "unsprung" portion of the vehicle, such as the opposite side frames of a wheel-truck or a truck spring plank.

The coil 95 and associated core member 99 are disposed on one side of the plate 106 with the poles or pole faces of the core toward the plate and the coil 96 and associated core member 101 are similarly disposed on the opposite side of the plate 106 with the pole faces of core 101 toward the plate. The struts 102 are suitably formed so as to permit lateral movement of the plate 106 relative to the core members 99 and 101 without striking the struts, as the car truck swivels with respect to the car body.

The arrangement of the magnetic cores 99 and 101 is such that when the car is empty, that is, when the load on a car truck is a minimum, the pole faces of the core member 101 are spaced from the lower face of plate 106 by a relatively small air gap whereas the pole faces of the core member 99 are spaced from the upper face of the plate 106 by a relatively large air gap. This position of the cores 99 and 101 corresponds to the position in which they are shown in Fig. 1 and indicated by the broken line marked "Empty".

As the load on the car truck increases, and the car body is lowered due to the truck springs becoming increasingly compressed, the core members 99 and 101 are lowered simultaneously with the car body and with respect to the plate 106 so that the core member 99 approaches the upper face of the plate 106 and the core member 101 moves away from the lower face of the plate 106.

When the car truck is fully loaded, the pole faces of the magnetic core 99 are spaced from the upper face of the plate 106 by only a relatively small air gap whereas the pole faces of the core 101 are spaced from the lower face of the plate 106 by a relatively large air gap. This position of the cores 99 and 101 corresponds to the position indicated by the broken line marked "Load".

In the event that the load on the car truck is greatly in excess of the full load and the truck springs are compressed sufficiently to permit the upper core member 99 to strike the plate 106, the supporting springs 107 on the lower side of the plate 106 are compressed and thus no damaging stresses are imposed on the plate or on the core members.

The coils 97 and 98 of the load-responsive device 16 are represented as impedance coils each having a shiftable tap connector for varying the amount of the coil included in the bridge circuit. If desired, however, the coils 97 and 98 may be replaced with variable non-inductive resistors.

The connection of the coils 95, 96, 97 and 98 in the form of a Wheatstone bridge circuit will be apparent in Fig. 1. As will be observed, the coils 95 and 97 are connected in series relation across two supply conductors 111 and 112 in parallel relation with the coils 96 and 98 which are likewise connected in series relation across the conductors 111 and 112. The supply conductors 111 and 112 are connected to the secondary of the transformer 26, the primary winding of which is connected across the terminals of the generator 25 under the control of a suitable circuit controller, indicated as a knife switch 113.

The transformer 26 is provided to impress a voltage across the conductors 111 and 112 suitable for operating the bridge of the load-responsive device 16, although the transformer 26 may be omitted if the voltage as supplied from the generator 25 is suitable.

One terminal of the primary winding of the transformer 27 is connected to the point of connection between the coils 96 and 97 and the opposite terminal of the primary winding of the transformer 27 is connected to the point of connection between the coils 95 and 98. The secondary winding of the transformer 27 is connected across the input terminals of the rectifier 17 by wires 115 and 116.

The output terminals of the rectifier 17 are connected by wires 117 and 118 to the opposite terminals of the potentiometer 21, the inductance coils 19 of the filter being connected in series relation with the potentiometer 21 and the condensers 20 being connected in parallel relation with the potentiometer 21 as shown in Fig. 1.

The vacuum tube amplifier 18 comprises a suitable envelope in which are contained in the usual relation, a filament 121, a plate 122, and a grid 123. The filament is connected in circuit with and heated by current supplied from the battery 28, hereinafter called the filament battery.

The plate 122 is connected by a wire 126 to one terminal of the battery 30 hereinafter called the plate battery. The opposite terminal of the plate battery 30 is connected by a conductor 127 in which is included an ammeter 24, to one terminal of the solenoid 98 of the control valve device 11. The opposite terminal of the solenoid 88 is connected by a conductor 128 to a terminal of the filament 121 to which the wire 117, leading from one of the output terminals, hereinafter referred to as the positive terminal, of the rectifier 17, is also connected.

Assuming that the circuit-controller 113 is closed and that the bridge circuit including the coils 95, 96, 97 and 98 is thus energized, it will be apparent that the transformer 27 will register the unbalanced voltage across the point of connection between coils 95 and 97 and the point of connection between the coils 96 and 98. Obviously, the ratio of the number of turns in the primary winding and in the secondary winding of the transformer 27 may be any desired step-up ratio in order to cause a relatively large variation in the output voltage from the secondary winding of the transformer 27 for a relatively small variation in voltage on the primary winding of the transformer 27.

The coils 97 and 98 of the bridge circuit and the transformer 27 are indicated and arranged diagrammatically for the purpose of simplicity. In actuality, however, they may be contained in a unitary casing conveniently located so as to provide ready access by the operator or driver of the car for adjusting the position of the shiftable tap connections to the coils 97 and 98.

In order to adjust the bridge circuit of the load-responsive device 16 for operation, the operator so adjusts the shiftable tap connections of the coils 97 and 98 so that, with the car truck carrying maximum or full load, there is zero or a uniform minimum unbalanced voltage impressed upon the primary winding of the transformer 27.

In view of the fact that the positive terminal of the rectifier 17 is connected to the filament 121 and one terminal of potentiometer 22 it will be apparent that the grid 123 of the tube amplifier 18 is at a negative potential. Thus, with the car truck loaded to a maximum degree and the transformer 27 registering zero or minimum unbalance, the output voltage from the rectifier 17 is a minimum and thus the negative potential bias on the grid 123 is a minimum. Accordingly, for reasons which will be readily understood by those skilled in the art, the plate current, that is, the current supplied by the plate battery 29 to energize the solenoid 80 is a maximum degree and, accordingly, the conoidal cam element 32 is shifted upwardly to a maximum degree.

By suitably adjusting the position of the movable tap connector of the potentiometer 22, the plate current, as registered on the ammeter 30, may be so controlled that the conoidal cam element 32 will be raised to such a position that the ball-bearing 69 on the end of the actuating rod 66 of the control valve device engages the cam surface of the cam element 32 substantially at the lower outer line 88 on the cam surface.

When the load is removed from the car truck, the core members 99 and 101 of the load-responsive device 16 return upwardly relative to the plate 106 to the "Empty" position shown in Fig. 1. The air gap between the pole faces of the upper core 99 and the plate 106 thus increases from a relatively small to a relatively large value, and the air gap between the pole faces of the lower core 101 decreases from a relatively large to a relatively small value. Consequently, the reluctance of the path of the magnetic flux set up by energization of the coil 95 is increased to a maximum and the reluctance of the path of the magnetic flux set up by energization of the coil 96 is reduced to a minimum. Thus, since the self-inductance, and thus the impedance, of the coils 95 and 96 is proportional to the flux lines or flux linkages threading the coils and since the maximum number of magnetic flux lines varies inversely in number with the reluctance of the magnetic flux path, it will be apparent that the impedance of and the impedance drop across the coil 95 reduces to a minimum whereas the impedance of and the impedance drop across the coil 96 increases to a maximum.

The coil 95 is associated with the core 99 and the coil 96 is associated with the core 101 in such manner that the poles of the two core members which are substantially in alignment with each other on opposite sides of the plate 106 are of like instantaneous polarity. Thus, substantially all of the magnetic flux set up by energization of the coil 95 leaves one pole of the core member 99, traverses the air gap to the upper face of the plate 106 then travels through the plate 106 and back across the air gap to the opposite pole of the core 99, while the flux set up by energization of the coil 96 leaves one pole of the core 101, traverses the air gap to the plate 106 and flows in the same direction as the flux set up by energization of the coil 95, and then after traversing the air gap reenters the opposite pole of the core. By thus minimizing the leakage of magnetic flux, the variation in the impedance drop across the coils 95 and 96 for a given vertical movement of the cores relative to the plate 106 is a maximum and thus maximum sensitivity of the load-responsive device 16 to variations in load is obtained.

It will thus be apparent that, due to the decrease in the impedance drop across the coil 95 and the increase in the impedance drop across the coil 96, the unbalanced voltage impressed on the primary winding of the transformer 27 is increased to a maximum and, therefore, that the output voltage supplied from the secondary winding of the transformer 27 to the rectifier 17, and the output voltage supplied from rectifier 17 to the potentiometer 22 is a maximum.

The negative potential bias on the grid 123 of the vacuum tube amplifier 18 is thus correspondingly increased due to the increased voltage drop across the potentiometer 22 and, according to well understood principles the plate current of the amplifier tube is correspondingly decreased to a certain minimum value.

The spring 83 acting to shift the conodial cam element 32 of the control valve device 11 downwardly is so designed as to shift the cam element 32 downwardly to its lowermost position wherein the ball-bearing 69 on the actuating rod 66 engages the cam surface of the cam element substantially on a line corresponding to the upper inner spiral line 87 on the cam surface, when the plate current, supplied from the vacuum tube amplifier 18 to energize the solenoid 80, decreases to the certain minimum value. Thus, with the car truck carrying a minimum load, that is, with the car empty, the cam element 32 of the control valve device 11 is accordingly positioned as shown in Fig. 1.

The solenoid coil 80 is suitably designed so as to withstand the heating effect due to constant energization thereof. Furthermore, since the solenoid coil 80 remains energized to a certain degree at all times, the magnetic core associated with the solenoid remains magnetized to a certain degree so that variation in the energizing current of the solenoid causes variations in the magnetic flux set up in the core and, consequently, variations in the force exerted by the plunger 89 to shift the cam element 32 more nearly in direct or straight-line relationship to variations in the energizing current of the solenoid. In other words, it is intended that variations in the energizing current for the solenoid coil 80 preferably occur over the straight-line portion of the saturation curve of the magnetic core associated with the coil.

*Operation of equipment shown in Fig. 1*

Let it be assumed that the main reservoir 13 is charged to its normal pressure as from a fluid compressor, not shown, that the brake valve handle 21 is in its normal release position so as to condition the control valve device 11 to effect release of the brakes, and that the car is empty and traveling along the road, the equipment thus being conditioned as shown in Fig. 1. If it is desired to effect an application of the brakes, the operator shifts the brake valve handle 21 from its normal release position into the application zone thereof a sufficient degree to cause the desired degree of braking force to be effected. As will be readily understood from previous description, the pressure established in the control pipe 14 upon operation of the brake valve handle 21 and acting in chamber 77 of the pressure device 15 on the piston 74 causes rotation of the rotary shaft 31 of the control valve device to a degree corresponding to the degree to which the brake valve handle 21 is displaced from its normal position. The control valve device 11 is thus operated, in the manner previously described, to cause fluid under pressure to be supplied to the brake cylinder 10 to establish a pressure therein corresponding to the degree of displacement of the brake valve handle 21 from its normal position.

Obviously, the operator may subsequently effect an increase or a decrease in the brake cylinder pressure by shifting the brake valve handle 21 to a greater extent out of its normal release position and returning it toward its release position, respectively. Furthermore, to effect release of the brakes, the operator merely shifts the brake valve handle 21 to release position thus causing reduction of pressure in the chamber 77 of the pressure device 15 to atmospheric pressure and the consequent return of the rotary shaft 31 of the control valve device to its normal position.

Now let it be supposed that from time to time as the car or train proceeds, either with the car in motion or at stopping points, the load on the car is increased and that the car truck, with which the load-responsive device 16 is associated, is loaded to a full or maximum degree so that the core members 99 and 101 of the load-responsive device 16 are shifted downwardly with respect to the plate 106 from the "Empty" position shown to the "Load" position indicated. Operating in a reverse manner to that previously described, the impedance drop across the coil 95 is thus increased to a maximum value while the impedance drop across the coil 96 is reduced to a minimum value, so that the unbalanced voltage impressed on the primary winding of the transformer 27 is reduced to zero or to a certain minimum value. As previously indicated, the plate current of the amplifier tube 18 is accordingly increased to a maximum and, therefore, the solenoid 80 of the control valve device is energized by a maximum current and causes the conoidal cam element 32 to be shifted to its uppermost position.

If the operator now effects an application of the brakes, it will be apparent that, due to the raising of the conoidal cam element 32, a given degree of displacement of the brake valve handle 21 from its normal position produces or causes to be established in the brake cylinder a higher pressure than in the previous case when the cam element 32 was in its lowermost position. The load-responsive device 16 thus operates to automatically control the control valve device 11 and condition it variously according to the load carried by a car truck so that the brake cylinder pressure or braking force established is proportioned automatically to the load carried by the car or car truck.

To effect a release of the brakes, the operator shifts the brake valve handle 21 back to release position just as in the previous case.

It will be apparent that undesired vibration or movement of the core members 99 and 101 of the load-responsive device 16 tends to occur, due to the shock and jar imposed on a car while traveling along the road and resulting in a slight up-and-down vibration of the car body with respect to the car truck. If sufficient, such undesired movement of the core members 99 and 101 with respect to the plate 106 will result in fluctuation of the exciting current for the solenoid 80 and, consequently, a continual undesired up-and-down movement of the conoidal cam element 32 of the control valve device 11. In order to avoid such undesirable condition, the weight or mass of the plate 106 is so related to the strength of the springs 107 positioning the plate between the tongues 108 as to move in synchronous vibration with the car body. That is, the weight of the plate 106 is related to the strength of the springs 107 in the same ratio or proportion as the weight of the car body is related to the strength of the truck springs supporting the car body. Thus, the plate 106 will vibrate in synchronism with the vibration of the car body due to shock and jars incident to travel of the car along the road and, consequently, the established air gap between the pole faces of the core members 99 and 101 and the plate 106 will remain substantially constant despite the vibration of the car body due to shocks and jars. Undesired fluctuations in the impedance drop across the impedance coils 95 and 96, due to shocks and jars sustained by the car while traveling along the road, will thus be negligible and consequently, the unbalanced voltage as registered on the secondary winding of the transformer 27, the output voltage of the rectifier 17, and the plate current of the amplifier tube 18 supplied to excite solenoid coil 80 will remain substantially constant for any given load on the car truck while the car is in motion.

If for some reason, such as the car truck springs taking a set, the car body sinks an appreciable amount toward the car truck, so that with the car fully loaded the upper core member 99 engages the plate 106, the adjusting screws 104 may be turned so as to elevate the core members 99 and 101 back to the original "Load" position wherein the original proper air gaps between the plate 106 and the pole faces of the core 99 is restored. Then, since the upward travel of the cores 99 and 101 with respect to the plate 106 may be less than previously, the original scope of variation of negative potential impressed on the grid 123 of the vacuum tube amplifier 18 may be obtained by shifting the position of the movable tap connector associated with the potentiometer 22 slightly so as to include more of the potentiometer in the grid circuit. Thus, notwithstanding that the travel of the core members 99 and 101 with respect to the plate member 106 may be shorter, in view of the fact that when the car truck carries a minimum or "Empty" load the core members 99 and 101 do not return upwardly to the original "Empty" position, nevertheless, substantially the same negative potential is imposed on the grid 123 and thus the deenergization of the solenoid coil 80 is decreased sufficiently to permit the cam element 32 to be lowered to its lowermost position.

It will also be apparent that in cases of different cars of the train, where the amount of movement of the car body relative to the car truck when the load on the car truck is increased from "Empty" condition to "Load" condition varies, the movable tap connector for the potentiometer 22 of each of the load-responsive mechanisms associated with each car truck may be adjusted to cause substantially the same variation in the exciting current for the solenoid coil 80 of the corresponding control valve device.

The advantages of the load-responsive device 16, which we have devised, should be readily apparent. Obviously, by obviating frictional wear of mechanically cooperative parts carried by the car body and the car truck, replacement or servicing of the equipment is not required, except for possible failure of the electrical parts or wires which is an infrequent occurence.

*Embodiment shown in Fig. 3*

Referring to Fig. 3, only so much of this embodiment as differs from the equipment shown in Fig. 1 is shown, and includes a load-responsive device 16a which differs somewhat from the load-responsive device 16 shown in Fig. 1. In the load-responsive device 16a, only one core member 99a corresponding to the upper core member 99 of the load-responsive device 16 is provided, the core member 99a being adjustably mounted to a fixed part of the car body in the same manner as the core member 99 of the device 16.

In the load-responsive device 16a, the core member 101 of the device 16 is omitted and a coil 96a corresponding to the coil 96 is provided. The coil 96a may be contained in a single casing also containing two coils 97a and 98a corresponding to the coils 97 and 98 of the load-responsive device 16 and a transformer 27a corresponding to the transformer 27.

The coils 95a, 96a, 97a and 98a are connected in the form of a Wheatstone bridge circuit in the manner shown in Fig. 3, the coils 95a and 97a being connected in series relation across the conductors 111 and 112 in parallel relationship to the coils 96a and 98a which are also connected in series relation across the conductors 111 and 112. The transformer 27a is connected to register the unbalanced voltage across the point of connection between the coils 96a and 98a and the point of connection between coils 95a and 97a. As in the case of the transformer 27, the secondary winding of the transformer 27a is connected across the input terminals of the rectifier 17.

The load-responsive device 16a is adjusted in a manner similar to the load-responsive device 16, that is, the movable tap connectors for the coils 97a and 98a are adjusted so that with maximum load on the car truck there is a zero or at least a certain minimum unbalanced voltage output from the secondary of the transformer 27a so that the conoidal cam element 32 of the control valve device 11 is raised to its uppermost position in the same manner as in the equipment shown in Fig. 1. Also in the same manner as in the case of the load-responsive device 16, when the load carried by the car truck is a minimum or "Empty" load, the unbalanced voltage output from the secondary of the transformer 27a is a maximum and the conoidal cam element 32 is correspondingly lowered to its lowermost position.

It will be apparent that as the core member 99a associated with the coil 95a is raised away from the upper face of the plate 106, the reluctance of the magnetic flux path through the core member 99a, the plate member 106 and the air gaps between the opposite pole faces of the core member and the plate 106 is increased due to the increased length of the air gap between the pole faces of the core member and the plate 106. Thus, as in the case of the load-responsive device 16, the maximum number of flux lines or flux linkages threading the coil 95a is reduced in proportion to the increase in reluctance of the magnetic flux path with the result that the impedance drop across the coil 95a correspondingly decreases, and effects an increase in the unbalanced voltage across the primary winding of the transformer 27a.

The operation of the embodiment shown in Fig. 3 being otherwise the same as described for the equipment shown in Fig. 1, further description of the operation of this embodiment is deemed unnecessary.

*Embodiment shown in Fig. 4*

Only so much of the equipment comprising the embodiment shown in Fig. 4 as differs from the embodiment shown in Fig. 1 is shown. The equipment shown comprises a load-responsive device 16 associated with one car truck for registering the load carried by that truck and a second load-responsive device 16 associated with another car truck for registering the load carried by the second truck. The impedance coils of the two load-responsive devices 16 are connected, in the same manner as previously described, across the supply conductors 111 and 112. The alternating current voltage impressed on the bridge circuits of the two load-responsive devices 16 is thus in synchronized phase relationship.

The secondary windings of the two transformers 27 are connected in additive series relationship and their combined voltage is impressed across the input terminals of the rectifier 17. It will thus be apparent that the unbalanced voltage as reflected in the degree of negative potential impressed on the grid of the vacuum tube amplifier is proportional at all times to the sum of the separate voltages induced in the secondary windings of the two transformers 27. Since the average of the separate voltages induced in the secondary winding of each of the two transformers 27 is equal to one-half of the sum of the two voltages, it will be apparent that the degree of negative potential impressed on the grid 123 of the vacuum tube 18 is always proportional to the average of the unbalanced voltage output of the secondaries of the two transformers 27.

It will, accordingly, be apparent that, by means of the equipment shown in Fig. 4, the degree of brake cylinder pressure effecting application of the brakes on two or more different car trucks may be automatically controlled according to the average load carried by all the trucks.

In view of the fact that the equipment shown in Fig. 4 operates to control the degree of application of the brakes in a manner analogous to that described for the equipment shown in Fig. 1, except in the respects noted, no further description of the operation is deemed necessary.

*Summary*

Summarizing, it will be seen that we have disclosed a variable load brake equipment including means which is continuously conditioned while the car or train is in motion according to the load on a car truck for automatically controlling the degree of an application of the brakes according to the load on the car truck. When employed in connection with a locomotive and tender brake equipment, our variable load brake equipment is of particular utility and advantage, therefore, because the fuel and water load on the tender varies continually and over a wide range while the locomotive is in motion. The equipment includes a load-responsive device in the form of Wheatstone bridge circuit having four impedance coils, one in each leg of the bridge circuit. Two of the impedance coils have associated cores adapted to move with the car body relative to a plate of magnetic material resiliently mounted on a fixed part of the car truck, the cores and associated coils being arranged on opposite sides of the plates whereby the air gap between the plate and the pole faces of one core increases as the air gap between the plate and the pole faces of the other core decreases. The variation in the reluctance of the magnetic flux path associated with the two coils due to movement of the cores relative to the plate correspondingly varies the impedance drop across the two coils and thus also correspondingly varies the unbalanced voltage measured by the bridge.

The degree of unbalanced voltage measured on the bridge circuit thus varies in accordance with the load carried by the car truck and suitable arrangement is made whereby the varying unbalanced voltage on the bridge circuit serves to variously condition a control valve device so that upon an application of the brakes correspondingly different brake cylinder pressures are established for a given operation of the control valve device.

In a second embodiment of the invention shown in Fig. 3, a load-responsive device is provided wherein only one of the coils of a bridge circuit is associated with a magnetic core which is movable relative to a plate mounted on the car truck according to the movement of the car body relative to the truck.

In a third embodiment shown in Fig. 4, two different load-responsive devices are associated respectively with two different car trucks and the unbalanced voltages of the Wheatstone bridge circuits are combined in additive series relation to control the conditioning of the control valve device. The brake cylinder pressure thus established upon an application of the brakes is accordingly controlled automatically according to the average load carried by a plurality of different car trucks.

Our invention has been illustrated specifically in connection with a single brake cylinder, but it will be apparent that in the case of a train brake equipment, similar equipment will be provided for each brake cylinder, the Wheatstone bridge circuits of each load-responsive device is being connected in identically the same manner across the same source of alternating-current voltage so as to insure synchronized phase relationship of impressed voltage. It will be apparent that various other omissions, additions or modifications may be made in the embodiments shown without departing from the spirit of our invention and, therefore, it is not our intention to limit the scope of our invention except as it is necessitated by the scope of the prior art.

Having now described our invention, what we claim as new and desire to secure by Letters Patent, is:

1. A vehicle variable load brake equipment comprising a Wheatstone bridge circuit having at least one impedance coil, means for varying the impedance of said coil in response to variations in the load carried on the vehicle to cause corresponding variations in the degree of voltage unbalance on the bridge circuit, and brake control means controlled according to the degree of voltage unbalance on the bridge circuit for controlling the degree of a brake application.

2. A vehicle variable load brake equipment comprising brake control means operative to effect application and release of the brakes and variously conditionable to establish different degrees of brake application for a given operation thereof, a Wheatstone bridge circuit having at least one impedance coil, means for varying the impedance of said coil in response to variations in the load carried on the vehicle to cause corresponding variation in the degree of voltage unbalance on the bridge circuit, and means responsive to the degree of voltage unbalance on the bridge circuit for varying the condition of the brake control means.

3. A vehicle variable load brake equipment comprising a Wheatstone bridge circuit having at least two impedance coils in separate legs thereof respectively, means for varying the impedance of the said two coils inversely upon variation in the load carried by the vehicle to cause corresponding variations in the degree of voltage unbalance on the bridge circuit, and brake control means controlled according to the degree of voltage unbalance on the bridge circuit for controlling the degree of a brake application.

4. A vehicle variable load brake equipment comprising brake control means operative to effect application and release of the brakes and variously conditionable to establish different degrees of brake application for a given operation thereof, a Wheatstone bridge circuit having at least two impedance coils in separate legs thereof respectively, means for varying the impedance of the two coils inversely upon variation in the load carried by the vehicle to cause corresponding variations in the degree of voltage unbalance on the bridge circuit, and means responsive to the degree of voltage unbalance on the bridge circuit for varying the condition of the brake control means.

5. A vehicle variable load brake equipment comprising a Wheatstone bridge circuit having at least one impedance coil, a magnetic core associated with said coil, a magnetic member, means for varying the position of the magnetic core and magnetic member relative to each other according to the load carried on the vehicle for effecting corresponding variations in the impedance of the said one coil to cause corresponding variations in the degree of voltage unbalance on the bridge circuit, and brake control means controlled according to the degree of voltage unbalance on the bridge circuit for controlling the degree of the brake application.

6. A vehicle variable load brake equipment comprising a Wheatstone bridge circuit having at least two impedance coils in separate legs thereof respectively, a magnetic core associated with one of said coils, a magnetic core associated with the other of said coils, a magnetic member, the said magnetic cores being arranged on opposite sides of said magnetic member respectively and movable simultaneously in one direction or the opposite direction so that one core approaches the magnetic member as the other core moves away therefrom, means for causing the magnetic cores and the magnetic member to assume different relative positions according to the load carried by the vehicle, the arrangement of the magnetic cores and the magnetic member being such that the impedance of one impedance coil increases while the impedance of the other coil decreases, and brake control means controlled according to the degree of voltage unbalance on the bridge circuit for controlling the degree of a brake application.

7. A vehicle variable load brake equipment comprising a Wheatstone bridge circuit having at least two impedance coils in separate legs thereof respectively, a magnetic core associated with one of said coils, a magnetic core associated with the other of said coils, a magnetic member, said two magnetic cores being disposed on opposite sides of the said magnetic member, means for causing the two magnetic cores to have fixed positions relative to each other, means for causing the said magnetic member to assume different positions relative to the two magnetic cores according to the load on the vehicle for varying inversely the impedance of the two impedance coils and thereby causing corresponding variations in the degree of voltage unbalance on the bridge circuit, and brake control means controlled according to the degree of voltage unbalance on the bridge circuit for controlling the degree of a brake application.

8. A vehicle variable load brake equipment comprising a Wheatstone bridge circuit having at least one impedance coil, a magnetic core associated with said coil movable according to the movement of a sprung portion of the vehicle, a magnetic member carried by an unsprung part of the vehicle, the magnetic core being positionable varying distances away from the said magnetic member according to the load carried by the vehicle to cause corresponding variations in the impedance of the said coil and a corresponding variation in the voltage unbalance on the bridge circuit, and brake control means controlled according to the degree of voltage unbalance on the bridge circuit for controlling the degree of a brake application.

9. A vehicle variable load brake equipment comprising a Wheatstone bridge circuit having at least one impedance coil, a magnetic core associated with the said coil, a magnetic member, means for varying the position of said core with respect to said magnetic member according to the load on the vehicle, the reluctance of the magnetic flux path including said magnetic core and said magnetic member being variable according to the position of the magnetic core relative to the magnetic member to correspondingly vary the impedance of the said coil and thereby the voltage unbalance on the bridge circuit, yielding means adapted to permit movement of the magnetic member with the magnetic core in the event of engagement of the magnetic core with the magnetic member, and brake control means controlled according to the degree of voltage unbalance on the bridge circuit for controlling the degree of a brake application.

10. A vehicle variable load brake equipment comprising a Wheatstone bridge circuit having at least one impedance coil, a magnetic core associated with said coil movable according to the movement of a sprung portion of the vehicle, a magnetic member carried by an unsprung part of the vehicle, the magnetic core being positionable varying distances away from the said magnetic member according to the load carried by the vehicle to cause corresponding variations in the impedance of the said coil and a corresponding variation in the voltage unbalance on the bridge circuit, and brake control means controlled according to the degree of voltage unbalance on the bridge circuit for controlling the degree of a brake application, said magnetic member being so constructed and arranged as to vibrate in substantial synchronism with the vibration of the sprung portion of the vehicle to prevent undesired variations in the degree of unbalance of the bridge caused by road shocks sustained by the vehicle.

11. A vehicle variable load brake equipment comprising a Wheatstone bridge circuit having at least two impedance coils located in different legs respectively of the bridge, a magnetic core associated with one of said coils, a magnetic core associated with the other of said coils, each of said cores having two poles of instantaneously opposite polarity respectively and the two cores being disposed in fixed relative position with the poles of like polarity in substantial register with each other, a magnetic member shiftable according to the load on the vehicle in the space between the poles of the cores to cause inverse variations of the reluctance of one magnetic flux path including one core and said magnetic member and another magnetic flux path including the other core and said magnetic member, the impedance of the two coils varying simultaneously and inversely according to the variation in the reluctance of the magnetic flux path including the core associated therewith to vary the degree of voltage unbalance on the bridge circuit, and brake control means controlled according to the degree of voltage unbalance on the bridge circuit for controlling the degree of a brake application.

12. A variable load brake equipment for a vehicle having a plurality of wheel trucks, comprising a plurality of means each of which provides a voltage varying according to the load carried on a corresponding wheel truck, and means controlled according to the sum of the separate voltages supplied by said plurality of means for controlling the degree of braking force with which an application of the brakes is effected.

13. A variable load brake equipment for a vehicle having a plurality of wheel trucks, comprising a plurality of load-responsive devices, one for each of said wheel trucks, each load-responsive device comprising a Wheatstone bridge circuit having at least one impedance coil, the impedance of which is varied according to the load on the corresponding truck to cause a corresponding variation in the degree of voltage unbalance on the bridge circuit, and means controlled according to the sum of the unbalanced voltages of all the bridge circuits for controlling the degree of braking force with which the brakes on all the wheel trucks are applied.

14. In a vehicle variable load brake equipment, in combination, means responsive to changes in load on the vehicle and including at least one impedance coil the electrical effect of which is varied in accordance with variations in the vehicle load, and means operatively conditioned as a result of variations in said electrical effect for controlling the degree of application of the brakes on the vehicle.

15. In a vehicle variable load brake equipment, in combination, means responsive to changes in load on the vehicle and including at least one impedance coil the impedance of which is varied according to variations in the vehicle load, and means variously conditioned as a result of variations in the impedance of said coil for controlling the degree of application of the brakes.

16. In a vehicle variable load brake equipment, two elements carried respectively on sprung and unsprung portions of the vehicle, said elements being out of contact with each other at all times and variously positioned relative to each other according to the load on the vehicle, electrical means adapted to have an electrical effect which varies dependent upon the position of said two elements relative to each other, and brake control means controlled according to the electrical effect of the said electrical means for controlling the degree of application of the brakes.

17. In a vehicle brake equipment, in combination, a brake cylinder, a manually operative element, means variously conditionable to establish different pressures in the brake cylinder for a given movement of the manually operative element from a normal position thereof, and means automatically responsive to variations in load on the vehicle and effective while the vehicle is in motion to correspondingly condition the said last means so that upon operation of the manually operative element, it effects a brake cylinder pressure in accordance with the load on the vehicle.

18. A vehicle brake equipment comprising a manually operative element, means variously conditionable to effect different degrees of application of the brakes at different times in response to operation of the said element a given amount out of a normal position thereof, and means operatively responsive at all times to the load on the vehicle for variously conditioning the last said means.

19. A vehicle brake equipment comprising brake control means having a rotary cam element, said control means being operative to effect various degrees of application of the brakes dependent upon the extent of displacement of said cam element rotarily out of a normal position, said cam element being so constructed and arranged as to be shiftable axially to different positions to vary the degree of application of the brakes for any given rotary position of the cam element, and means controlled by the load on the vehicle for controlling the axial position of said cam element.

20. In a variable load brake equipment for a vehicle or train, in combination, a brake cylinder, a manually operative element, means operative, in response to the operation of the said manually operated element, for establishing a fluid pressure in the brake cylinder in accordance with the degree of operative movement of the manually operative element from the normal position thereof, a solenoid energizable to different degrees for correspondingly varying the response of said last means to a given operative movement of the said manually operative element to correspondingly vary the brake cylinder pressure, and means for energizing the said solenoid to different degrees according to the load on the vehicle.

21. In a variable load brake equipment for a vehicle or train, in combination, a brake cylinder, a normally uncharged pipe chargeable with fluid at different pressures, means controlled according to the pressure established in said pipe and effective to establish a pressure in the brake cylinder having different ratios to the pressure in said pipe, a solenoid energizable to different degrees for causing the said last means to establish different ratios between the pressure in the brake cylinder and the pressure in said pipe, and means for energizing the said solenoid to different degrees in accordance with the load on a vehicle.

22. In a variable load brake equipment for a vehicle or train, in combination, a brake cylinder, a self-lapping valve device for controlling the supply of fluid under pressure to and the release of fluid under pressure from the brake cylinder to effect application and release of the brakes respectively, a manually operative element shiftable from a normal brake release position to different degrees into an application zone for effecting corresponding operation of said valve device to establish a pressure in the brake cylinder corresponding to the extent to which the operating element is shifted into the application zone, and means responsive to the load on the vehicle for causing a given movement of the manually operative element into the application zone to cause operation of the self-lapping valve device to establish different pressures in the brake cylinder.

23. In a variable load brake equipment for a vehicle or train, in combination, a brake cylinder, a self-lapping valve device including an actuating rod operative to different degrees out of a normal position thereof to cause different corresponding pressures to be established in the brake cylinder, a rotary shaft, a rotary cam element operated by rotation of the said rotary shaft for effecting movement of the operating rod of the self-lapping valve device to establish a pressure in the said brake cylinder corresponding to the angle through which the said rotary shaft is moved out of a normal position thereof, said cam element being shiftable axially to different positions relative to the actuating rod and so constructed and arranged as to cause different degrees of movement of the actuating rod from its normal position, in the different axial positions thereof, for rotation of the rotary shaft through a given angle from its normal position, and means controlled according to the load on the vehicle for shifting the said cam element to corresponding different positions.

JOHN CANETTA.
JOHN B. GROSSWEGE.